United States Patent
Hiromitsu et al.

(10) Patent No.: US 7,553,784 B2
(45) Date of Patent: Jun. 30, 2009

(54) CLEANING MATERIAL FOR MOLDING METAL DIE, AND CLEANING METHOD

(75) Inventors: Kiyohito Hiromitsu, Uozu (JP); Hiroaki Nomura, Uozu (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 569 days.

(21) Appl. No.: 10/537,358

(22) PCT Filed: Nov. 28, 2003

(86) PCT No.: PCT/JP03/15218

§ 371 (c)(1),
(2), (4) Date: Jun. 3, 2005

(87) PCT Pub. No.: WO2004/052610

PCT Pub. Date: Jun. 24, 2004

(65) Prior Publication Data

US 2006/0065990 A1    Mar. 30, 2006

(30) Foreign Application Priority Data

| Dec. 6, 2002 | (JP) | 2002-354580 |
| Dec. 6, 2002 | (JP) | 2002-354581 |
| Dec. 6, 2002 | (JP) | 2002-354582 |
| Dec. 6, 2002 | (JP) | 2002-354583 |
| Sep. 29, 2003 | (JP) | 2003-336742 |

(51) Int. Cl.
*A47L 13/16*    (2006.01)

(52) U.S. Cl. ............ 442/394; 401/201; 134/6

(58) Field of Classification Search ............ 442/394; 401/201; 134/6
See application file for complete search history.

(56) References Cited

U.S. PATENT DOCUMENTS

| 4,469,729 | A | * | 9/1984 | Watanabe et al. | 428/36.2 |
| 4,670,329 | A | | 6/1987 | Pas | |
| 5,972,470 | A | * | 10/1999 | Engst | 428/140 |
| 6,101,661 | A | * | 8/2000 | Policicchio et al. | 15/228 |
| 6,669,391 | B2 | * | 12/2003 | Policicchio et al. | 401/270 |
| 6,739,161 | B2 | * | 5/2004 | Ohara et al. | 66/194 |

FOREIGN PATENT DOCUMENTS

| JP | 7-304044 | 11/1995 |
| JP | 10-67021 | 3/1998 |
| JP | 2001-79857 | 3/2001 |

OTHER PUBLICATIONS

English translation of Jul. 7, 2006 Chinese Official Action in corresponding Chinese Application No. 200380104791.2.

* cited by examiner

*Primary Examiner*—Gregory E Webb
(74) *Attorney, Agent, or Firm*—Young & Thompson

(57) ABSTRACT

A sheet-like cleaning material for a molding metal die formed by enclosing a cleaning member in at least two layers of sheet-like base materials, characterized in that the cleaning member is formed of one type of tablet-like, granular, or powdery cleaning member or a sheet-like or a plate-like cleaning member. The cleaning material for the molding metal die desirably involves a forming member together with the cleaning member, the sheet-like base materials are desirably formed of sheet-like fiber base materials with a porosity of 70 vol. % or more, and the sheet-like fiber base materials are used as the outermost layer of the cleaning material for the molding metal die.

5 Claims, 5 Drawing Sheets

CLEANING MATERIAL FOR MOLDING METAL DIE, AND CLEANING METHOD

This is a 371 National Stage application of International Application No. PCT/JP03/15218, filed Nov. 28, 2003, which claims priority to Japanese Application Nos. 2002-354580; 2002-354581; 2002-354582; and 2002-354583, each filed on Dec. 6, 2002, and Japanese Application No. 2003-336742, filed on Sep. 29, 2003. The entire contents of the above-referenced applications are hereby incorporated by reference in their entirety.

TECHNICAL FIELD

The present invention relates to a mold cleaning material and a mold cleaning method for cleaning the surface of an injection or transfer molding die for electronic component encapsulation.

BACKGROUND ART

When encapsulation molding of integral circuits, etc. (hereinafter referred to as IC/LSIs) with a thermosetting resin such as an epoxy resin is continued for a long time, cases not infrequently occur in which the inner surface of the mold is stained, and continuation of molding with such a stained mold results in contamination of the surface of the molded products or adhesion of the molded product to the mold surface, making further shots impossible. The mold should be cleaned periodically, which is practiced by making a few shots with a mold cleaning resin per several hundreds of shots with a molding material thereby to remove deposited stubborn stain.

Mold cleaning using a conventional cleaning resin is carried out by a method comprising setting a lead frame to be encapsulated or a dummy lead frame made of cheap metal or paper in a mold and filling the cavity with a cleaning resin compound from a transfer pot or a method comprising placing a cleaning resin compound on the parting face, clamping the mold, and heating.

However, these mold cleaning methods have the following problems. According to the method comprising setting a lead frame to be encapsulated or a dummy lead frame in a mold and filling the cavity with a cleaning resin compound from a pot, the lead frame or the dummy lead frame used for cleaning is encapsulated in the cleaning resin and becomes non-reusable. That is, a new lead frame or a new dummy lead frame should be used for each cleaning shot, which is uneconomical.

Another problem is that, when a lead frame or a metal-made dummy lead frame is used, the molded part resulting from the cleaning operation must be separated into the resin part and the metal part before disposal as industrial waste. Besides, the separation is difficult.

In order to overcome these problems, a compression type cleaning method is also practiced, which is carried out by heat melting and curing a cleaning resin compound between upper and bottom mold without using a lead frame or a dummy lead frame. This method is disadvantageous in that placement of the cleaning resin needs time and that occurrence of resin leakage or chipping makes the cleaning cycle time longer, which results in a totally increased cleaning time.

To address the above-mentioned problems, JP-A-7-304044 proposes a cleaning method using a cleaning material prepared by preliminarily molding a cleaning resin on a base sheet or tape.

The cleaning material of JP-A-7-304044 is prepared by preliminarily molding a cleaning resin, such as an epoxy resin or a melamine resin, on a sheet or tape form base by low-temperature pressure forming of the resin powder (tableting) or fusion bonding. However, tableting the cleaning resin powder onto the base to make an integral cleaning material is difficult. Moreover, the tableting, even if carried off, is accompanied by dusting, and the formed resin powder tends to lose the shape during transportation. Where fusion bonding is adopted to preliminarily mold the cleaning resin on the base, it is also difficult to carry out. Even if the resin is successfully fusion bonded to the base, flowability of the cleaning resin is reduced by the thermal history given to the resin during fusion bonding. It follows that the cleaning resin fails to fill every part of the mold only to result in insufficient cleaning. Making through-holes in the base, as suggested to improve flowability of the cleaning resin to the cabity, leads to reduction in strength of the base.

In addition, diversification of electronic devices including IC packages has diversified molding dies therefor. This has made it very difficult to dispose the cleaning resin in accurately right position corresponding to the cavity. That is, the cleaning resin has poor workability in mold cleaning.

DISCLOSURE OF THE INVENTION

In order to resolve the foregoing problems of related art, the present invention proposes using a mold cleaning material of sheet form comprising at least two base sheets and a cleaning member enclosed therebetween, the cleaning member having at least one of a tablet form, a granular form, a powder form, a sheet form, and a plate form. According to the present invention, dusting, shape loss during transportation, and reduction of flowability are prevented. Where a sealing member such as film or tape is used to enclose the cleaning member between two base sheets, it serves as a stopper preventing resin leakage during cleaning. This excludes the necessity to set the cleaning material in an accurately right position corresponding to the cavity of a mold, whereby the workability problem can be settled.

The present invention also proposes using a mold cleaning material having enclosed therein a molding member in combination with the cleaning member, thereby to enhance the above-described effects.

The present invention also proposes using a mold cleaning material wherein at least the outermost base sheets are fibrous sheets having a porosity of 70% or more. This structure produces not only the above-described effects but the effect that the mold cleaning material exhibits sufficient strength while allowing the cleaning member and the molding member to fill every part of the mold.

THE BEST MODE FOR CARRYING OUT THE INVENTION

Figure 1:
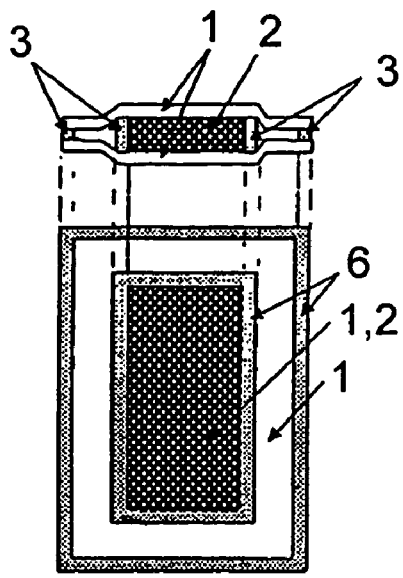
FIG. 1 is a cross-section and a see-through view of cleaning material A of sheet form prepared in Example 1.

The base sheets (nets) which can be used in the present invention include fibrous sheets having a heat resistance of 100° C. or higher, such as paper, woven fabric, and nonwoven fabric.

Taking ease of waste disposal, such as incineration, into consideration, base sheets made of paper, cotton, etc. are preferred. Meshes made of yarns are also preferably used.

Examples of the base sheets include Bemliese® P0500, BA832, 832R, BA112, 112R, RB119, 142, 149, and 839 (available from Asahi Kasei Fibers Corp.); Ecule® 6301A, 6401A, 6501A, 6601A, 6701A, and 6A01A and Volans® 4050P, 4061P, 4080P, 4081P, 4091P, 7093P, and 7121P (available from Toyobo Co., Ltd.); Miracle Cloth® DF-1-73 and DF-5-100 and Apitas® RPN5-60SA and LS-70 (available from Daiwabo Co., Ltd.); Marix® 10606WTD, 70500WSO, 90403WSO, 20451FLV, 2070WTA, and 70600WTO, Nyace® P0703WTO, and WiWi® R0405WTO and R0705WTO (available from Unitika, Ltd.); Kinocloth® KS40, K60, and K70 and Palcloth® P40 and P60 (available from Oji Kinocloth Co., Ltd.); Panelon® 2610, 270, 6810, K550, 5130, S30Off, 3700, RF860, 7330Gp, 5140, 5150, 5160, FT500, FT800, T0510, and IH250 (available from Dynic Corp.); Oikos® AP2050, AP2060, AP2080, AP2120, AM2060, AK2045, TDP2050, and TDP2060 (available from Nisshinbo Industries, Inc.); and 4000CR, PS-750CR, 8890CR, WE-60CR, H-8010E, JH-3003N, HP21, and HP55 (available from Japan Vilene Co., Ltd.).

It is preferred for the fibrous base sheet to have a porosity of 70% or more, particularly 80 to 100%. It is advisable to use the fibrous base sheet with a porosity of 70% or more as an outermost layer of the cleaning material. Examples of the fibrous base sheets with a porosity of 70% or more are Bemliese® P0500, BA832, 832R, BA112, 112R, RP119, 142, 149, and 839 (from Asahi Kasei Fibers Corp.); Ecule® 6301A, 6401A, 6501A, 6601A, 6701A, and 6A01A and Volans® 4050P, 4061P, 4080P, 4081P, 4091P, 7093P, and 7121P (from Toyobo Co., Ltd.); Panelon® 2610, 270, 6810, K550, 5130, S30Off, 3700, RF860, T0510, and IH250 (from Dynic Corp.); Oikos® AP2050, AP2060, AP2080, AM2060, AK2045, TDP2050, and TDP2060 (from Nisshinbo Industries, Inc.); and HP21 and HP55 (from Japan Vilene Co., Ltd.).

These fibrous base sheets are capable of allowing the cleaning member and the molding member to fill throughout the mold without requiring a number of holes made therethrough. Having no holes, they have strength not to tear or break when removed after cleaning.

These bases can be used either alone or as a combination thereof. For instance, a set of two thin sheets or a thick sheet having a thin sheet on outsides thereof can make one base sheet. To assure flowability, a base sheet of coarse mesh can be disposed outside, while a base sheet of fine mesh inside.

Although the size of the base sheets is not particularly limited, it is advisable to use base sheets slightly larger than the mold area in case the resin leaks from air vents, etc. during cleaning. Even if the resin leaks, it would be absorbed by the margin of the base sheets, and the time required for clearing the leaked resin can be reduced.

The size of the margin is not generally specified because the resin's penetrability into the base sheet varies depending on the base sheet/resin combination. Nevertheless a recommended margin is about 5 cm or wider from the edge of the mold, taking the workability after cleaning operation into consideration.

The cleaning member having at least one form selected from a tablet form, a granular form, a powder form, a sheet form, and a plate form is enclosed in between two cut base sheets or in a bag made by folding a single sheet at least twice as large as the mold area into two.

At least one sealing member selected from a thermoplastic resin film, a thermoplastic resin tape, a double sided tape, an adhesive, a pressure-sensitive adhesive, etc. may be applied to a prescribed part of one or more of the base sheets.

The thermoplastic resin film or tape can be applied to the base sheet by any method. For example, the base sheet is laminated with a thermoplastic resin film, or a thermoplastic resin tape of given width is stuck to the base sheet, or the base sheet is laminated with a thermoplastic resin film whose central portion of moderate size has been cut out.

The base sheets may be adhered together by pressing or deforming without using any sealing member.

The method of enclosing a cleaning member is not particularly limited. For example, a thermoplastic resin film is applied to a prescribed part of a lower base sheet, and a given weight of a cleaning member having at least one of a tablet form, a granular form, a powder form, a sheet form, and a plate form is put on the lower base sheet in the part not covered with the thermoplastic resin film. Another base sheet (upper base sheet) having the same shape as the lower one is superposed thereon. The superposed base sheets are heat sealed together taking care not to move the cleaning member disposed therebetween.

It is preferred that the part where the cleaning member is to be placed be divided into sections having a moderate area so that the cleaning member may not move during transportation.

A base sheet with a double sided adhesive tape, an adhesive, a pressure-sensitive adhesive, etc. applied to a prescribed part thereof over a moderate area may also be used to enclose the cleaning member.

Where the cleaning member is sealed (enclosed) by adhering the base sheets either with a double sided tape, an adhesive, a pressure-sensitive adhesive, etc. or by heat sealing via a thermoplastic resin film or tape, it is preferred to apply the sealing member around the cleaning member as well as to the edges of the base sheets, whereby the cleaning member is double sealed. Should the inner sealing member melt to allow the cleaning member to flow out, it will be held back by the outer sealing member and thereby prevented from leaking.

The cleaning member used in the present invention mainly comprises a melamine resin. A melamine resin is a resin obtained by methylolating a triazine, e.g., melamine, with formaldehyde, etc. A melamine-formaldehyde resin is usually used.

A melamine-formaldehyde resin is generally produced in the form of an aqueous solution. A powdered cleaning member is obtained by drying the aqueous solution by, for example, spray drying. A granular cleaning member is obtained by blending the aqueous solution with pulp followed by drying. A tablet-shaped cleaning member is obtained by punching the powdered or granular resin.

A cleaning member of sheet form is obtained by impregnating a base sheet with the melamine-formaldehyde resin aqueous solution followed by drying. A cleaning member of plate form is obtained by, for example, impregnating a base plate with the aqueous solution followed by drying.

The impregnation is achieved by dipping the base sheet or plate in the melamine-formaldehyde resin aqueous solution and drying the impregnated base to give a cleaning member of sheet or plate form. The impregnation ratio of the resin into the base can be adjusted as desired by, for example, altering the kind of the base, adjusting the resin solution concentration, or controlling the degree of squeezing off the resin. The impregnation ratio is also adjustable by controlling the curability or flowability of the resin.

The powdered or granular cleaning member may be mixed with additives (such as a lubricant, mineral powder, and a curing catalyst) by means of a kneader, a ribbon blender, a Henschel mixer, a ball mill, etc. The resulting mixed powder or granules can be punched into tablets.

The cleaning member of sheet or plate form can be cut to shape, including squares, rectangles, strips, and other shapes, on use. A cut piece which has a high impregnation ratio can be used alone or as combined with another one or two. Several cut pieces which have a low impregnation ratio can be used as stacked on top of each other.

The cleaning member can be shaped to the shape of a mold or can be disposed so as to efficiently fill the cavity and the pot with the resin.

Compared with the method of JP-A-7-304044 supra, use of the cleaning member of sheet or plate form makes it feasible to dispose the resin more uniformly in a mold and to prevent incomplete fill.

After a cleaning shot with the mold cleaning material enclosing a cleaning member therein, the base sheets are embedded in a molded product. Therefore, the base sheets have the same effect as a filler enhancing the strength of a molded product. Commercially available cleaning members contain pulp for increasing the molded product strength. Replacement of pulp with the base sheet brings about increased bonding strength between a filler and a molded product, leading to increased strength of a molded product. Sufficient resin penetrability can be secured by using a fibrous base sheet with a porosity of 70% or more as an outermost layer. A combined use of the base sheet with a filler further improves the molded product strength. The improved molded product strength provides a resolution to the chipping problem arising from the stronger bonding force between a mold and mold stains than the molded product strength. As a result, workability as well as cleaning performance are improved.

The cleaning material of the present invention can contain a molding member selected from unvulcanized synthetic rubber and unvulcanized natural rubber in addition to the cleaning member of tablet, granular, powder, sheet or plate form.

The synthetic rubber includes, but is not limited to, butyl rubber, acrylic rubber, silicone rubber, polybutadiene, polyisoprene, a styrene-butadiene copolymer, a styrene-isoprene copolymer, an acrylonitrile-butadiene copolymer, an ethylene-α-olefin copolymer, an ethylene-α-olefin-polyene copolymer, a styrene-butadiene-styrene block copolymer, a styrene-isoprene-styrene block copolymer, a hydrogenated styrene-ethylene-butylene-styrene block copolymer, and an ethylene-based ionomer.

The unvulcanized synthetic or natural rubber exhibits moderate viscoelasticity when heat melted. It is a member having an important function of moving the upper and the lower base sheets toward the upper and the lower sides of a mold when the mold is clamped. This function brings the base sheets close to the cavity surface thereby reducing chipping that tends to occur in the corners or the air vent of the cavity. The function also improves filling of the cavity with the resin thereby eliminating such defects as incomplete fill resulting from insufficient flowability of the cleaning resin or insufficient pressure during cleaning.

The present invention will now be illustrated in greater detail with reference to Examples, but it should be understood that the invention is not limited thereto. Unless otherwise noted, all the percents and parts are by weight.

REFERENCE EXAMPLE 1

A melamine-formaldehyde resin was synthesized by a heat reaction between 480 parts of melamine and 522 parts of formalin (37% aqueous solution) in a known manner. The resulting resin solution was kneaded with 248 parts of pulp, and the mixture was dried under reduced pressure to obtain a pulp-loaded melamine-formaldehyde resin, which was roughly ground in a shear grinder to prepare melamine-formaldehyde resin granules.

REFERENCE EXAMPLE 2

An ethylene-propylene-diene rubber having a Mooney viscosity of 25 was masticated in a pressure kneader for 10 minutes. The resulting mass was extruded with a twin-screw extruder into sheeting, which was rolled into an unvulcanized rubber sheet of 150 mm in width and 3 mm in thickness.

REFERENCE EXAMPLE 3

A melamine-formaldehyde resin was prepared by a heat reaction between 480 parts of melamine and 522 parts of formalin (37% aqueous solution) in a known manner. The resulting resin solution was kneaded with 248 parts of pulp, and the mixture was dried under reduced pressure to obtain a pulp-loaded melamine-formaldehyde resin powder.

PREPARATION EXAMPLE 1

Sixty parts of the pulp-loaded melamine-formaldehyde resin granules obtained in Reference Example 1, 100 parts of a commercially available melamine resin (Nikaresin S-176, available from Nippon Carbide Industries, Co., Inc.), 0.5 parts of benzoic acid, and 1 part of zinc stearate were mixed and ground in a ball mill to prepare a mold cleaning resin compound. The resulting compound was tableted on a tableting machine to prepare tablet-shaped cleaning member (1).

PREPARATION EXAMPLE 2

Sixty parts of the pulp-loaded melamine-formaldehyde resin granules obtained in Reference Example 1, 100 parts of a commercially available melamine resin (Nikaresin S-176, available from Nippon Carbide Industries, Co., Inc.), 0.5 parts of benzoic acid, and 1 part of zinc stearate were mixed in a Naughter mixer to prepare granular cleaning member (2).

PREPARATION EXAMPLE 3

Sixty parts of the pulp-loaded melamine-formaldehyde resin granules obtained in Reference Example 1, 100 parts of a commercially available melamine resin (Nikaresin S-176, available from Nippon Carbide Industries, Co., Inc.), 0.5 parts of benzoic acid, and 1 part of zinc stearate were mixed and ground in a ball mill to prepare powdered cleaning member (3).

PREPARATION EXAMPLE 4

Sixty parts of the pulp-loaded melamine-formaldehyde resin granules obtained in Reference Example 3, 100 parts of a commercially available melamine resin (Nikaresin S-176, available from Nippon Carbide Industries, Co., Inc.), 0.5 parts of benzoic acid, and 1 part of zinc stearate were mixed and ground in a ball mill to prepare a mold cleaning resin compound. The resulting compound was extruded with a twin-screw extruder (L/D: 20; diameter: 40 mm) at a cylinder temperature of 80° C., a T-die temperature of 100° C. and a screw rotating speed of 130 rpm to prepare plate-shaped cleaning member (4) having a width of 150 mm and a thickness of 3 mm.

PREPARATION EXAMPLE 5

A hundred parts of a commercially available melamine resin (Nikaresin S-176, available from Nippon Carbide Industries, Co., Inc.), 10 parts of pulp powder, 0.3 parts of benzoic acid, and 0.7 parts of zinc stearate were mixed and ground in a ball mill to prepare a mold cleaning resin compound. The resulting compound was sandwiched in between two pieces of Bemliese BA-832 (available from Asahi Kasei Fibers Corp.) and preliminarily shaped in a hot press at 120° C. for 30 seconds to obtain sheet-shaped cleaning member (5) composed of two 150 mm wide and 300 mm long base sheets and a 150 mm wide, 200 mm long and 4 mm thick plate-shaped cleaning member interposed between the base sheets.

PREPARATION EXAMPLE 6

A hundred parts of a commercially available melamine resin (Nikaresin S-260, available from Nippon Carbide Industries, Co., Inc.) was dissolved in 100 parts of water. The aqueous resin solution was mixed with 0.5 parts of a curing catalyst (Catanit A, available from Nitto Riken Co., Ltd.), 0.5 parts of a wetting agent (Rapisol A80, available from NOF Corp.), and 0.7 parts of a parting agent (SH3771 OIL, available from Dow Corning Toray Silicone Co., Ltd.) to prepare an aqueous solution of a mold cleaning resin compound.

Bemliese RB-149 (available from Asahi Kasei Fibers Corp.) was impregnated with the resulting aqueous solution, passed through squeeze rolls, and dried in a screen type hot air dryer at 100° C. to obtain a sheet-shaped cleaning member (6) of 150 mm in width and 200 mm in length.

PREPARATION EXAMPLE 7

Sixty parts of the pulp-loaded melamine-formaldehyde resin granules obtained in Reference Example 3, 100 parts of a commercially available melamine resin (Nikaresin S-176, available from Nippon Carbide Industries, Co., Inc.), 0.5 parts of benzoic acid, and 1 part of zinc stearate were mixed and ground in a ball mill to prepare a mold cleaning resin compound. The resulting compound was extruded with a twin-screw extruder (L/D: 20; diameter: 40 mm) at a cylinder temperature of 80° C., a T-die temperature of 100° C. and a screw rotating speed of 130 rpm to prepare plate-shaped cleaning member (7) having a width of 100 mm and a thickness of 1 mm.

PREPARATION EXAMPLE 8

A hundred parts of a commercially available melamine resin (Nikaresin S-260, from Nippon Carbide Industries, Co., Inc.) was dissolved in 100 parts of water, and 0.5 parts of a curing catalyst (Catanit A, from Nitto Riken Co., Ltd.), 0.5 parts of a wetting agent (Rapisol A80, from NOF Corp.), and 0.7 parts of a parting agent (SH3771 OIL, from Dow Corning Toray Silicone Co., Ltd.) were mixed and dissolved therein to prepare an aqueous solution of a mold cleaning resin compound.

Bemliese RB-149 (from Asahi Kasei Fibers Corp.) was impregnated with the resulting aqueous solution, passed through squeeze rolls, and dried in a screen type hot air dryer at 100° C. to obtain 150 mm wide and 300 mm long sheet-shaped cleaning member (8).

PREPARATION EXAMPLE 9

A hundred parts of a commercially available melamine resin (Nikaresin S-260, from Nippon Carbide Industries, Co., Inc.) was dissolved in 100 parts of water, and 0.5 parts of a curing catalyst (Catanit A, from Nitto Riken Co., Ltd.), 0.5 parts of a wetting agent (Rapisol A80, from NOF Corp.), and 0.7 parts of a parting agent (SH3771 OIL, from Dow Corning Toray Silicone Co., Ltd.) were mixed and dissolved therein to prepare an aqueous solution of a mold cleaning resin compound.

Bemliese BA-112 (from Asahi Kasei Fibers Corp.) was impregnated with the resulting aqueous solution, passed through squeeze rolls, and dried in a screen type hot air dryer at 100° C. to obtain 250 mm wide and 300 mm long sheet-shaped cleaning member (9).

PREPARATION EXAMPLE 10

Sixty parts of the pulp-loaded melamine-formaldehyde resin granules obtained in Reference Example 1, 40 parts of a commercially available melamine resin (Nikaresin S-176, available from Nippon Carbide Industries, Co., Inc.), 0.5 parts of benzoic acid, and 0.5 parts of zinc stearate were mixed and ground in a ball mill to prepare a mold cleaning resin compound. The resulting compound was tableted in a tableting machine to prepare plate-shaped cleaning member (10).

PREPARATION EXAMPLE 11

The plate-shaped cleaning member (10) obtained in Preparation Example 10 was ground in a crusher and sieved to remove fine particles to prepare granular cleaning member (11).

PREPARATION EXAMPLE 12

A hundred parts of an ethylene-propylene-diene rubber having a Mooney viscosity of 15 and 10 parts of an oil mainly comprising petroleum hydrocarbons were kneaded in a pressure kneader for 10 minutes. The resulting mass was extruded with a twin-screw extruder into sheeting, which was rolled to prepare sheet-shaped molding member (12) having a width of 150 mm and a thickness of 3 mm.

PREPARATION EXAMPLE 13

A melamine-formaldehyde resin was prepared by a heat reaction between 480 parts of melamine and 522 parts of formalin (37% aqueous solution) in a known manner. The resulting resin solution was kneaded with 120 parts of pulp, 0.5 parts of benzoic acid, and 0.5 parts of zinc stearate to prepare pasty cleaning member (13).

EXAMPLE 1

Two sheets of nonwoven fabric (Bemliese RB-149 available from Asahi Kasei Fibers Corp.) having a width of 250 mm and a length of 300 mm were joined by hot melting a thermoplastic resin film applied to the two long side edges and the position 50 mm inward from each long side edge (heat sealing).

The inside section formed by the thermoplastic resin tape was filled with the tablet-shaped cleaning member (1) prepared in Preparation Example 1 and heat sealed via a thermoplastic resin film at the two short side edges and the position 50 mm inward from each short side edge in the same manner as described above to obtain mold cleaning material A of sheet form shown in FIG. 1.

The resulting cleaning material A was subjected to a mold cleaning test (described later). The results obtained are shown in Table 1. As can be seen from the results, the mold cleaning material A showed satisfactory cleaning effects.

EXAMPLE 2

Figure 2:
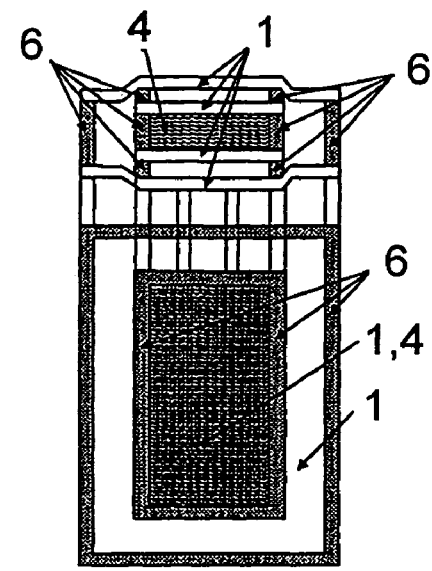
FIG. 2 is a cross-section and a see-through view of cleaning material B of sheet form prepared in Example 2.

Two 150 mm wide and 200 mm long base sheets (Bemliese BA-832, from Asahi Kasei Fibers Corp.) were joined by hot melting via a thermoplastic resin film along two long side edges and a line 50 mm inward from each long side edge. The inside sections formed by the thermoplastic resin tape were filled with the granular cleaning member (2) prepared in Preparation Example 2. The open edges of the sections were closed by hot melting via a thermoplastic resin tape to obtain a cleaning member of sheet form. The resulting cleaning member was sandwiched and fixed between two 200 mm wide and 300 mm long base sheets (Bemliese RB-149, from Asahi Kasei Fibers Corp.) in the center, and the edges were hot melted via a thermoplastic resin tape to obtain mold cleaning material B of sheet form shown in FIG. 2.

The resulting cleaning material B was subjected to a mold cleaning test. The results obtained are shown in Table 1. As can be seen from the results, the mold cleaning material B showed satisfactory cleaning effects.

EXAMPLE 3

Two 150 mm wide and 200 mm long base sheets (Volans 4091P, from Toyobo Co., Ltd.) were superposed and heat sealed along two long side edges and a line 50 mm inward from each long side edge to make three divided sections.

The three sections were each filled with the powdered cleaning member (3) prepared in Preparation Example 3. The open edges of the three sections were heat sealed to obtain a cleaning member of sheet form.

Figure 3:
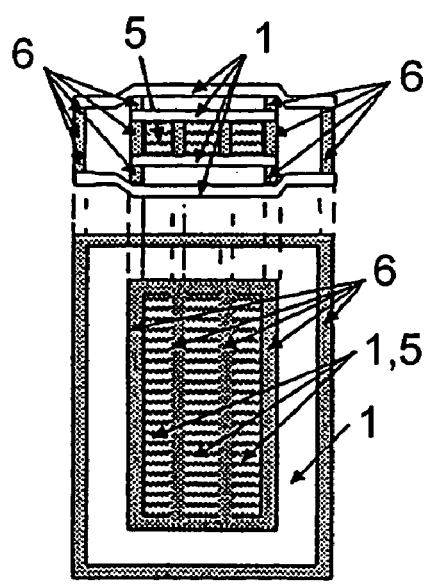
FIG. 3 is a cross-section and a see-through view of cleaning material C of sheet form prepared in Example 3.

The resulting cleaning member was sandwiched between a pair of 250 mm wide and 300 mm long base sheets (Volans 4091P, from Toyobo Co., Ltd.) in the center, and all the edges were heat sealed to obtain mold cleaning material C of sheet form shown in FIG. 3.

The resulting mold cleaning material C was subjected to a mold cleaning test. The results obtained are shown in Table 1. As can be seen from the results, the mold cleaning material C showed satisfactory cleaning effects.

COMPARATIVE EXAMPLE 1

Figure 4:
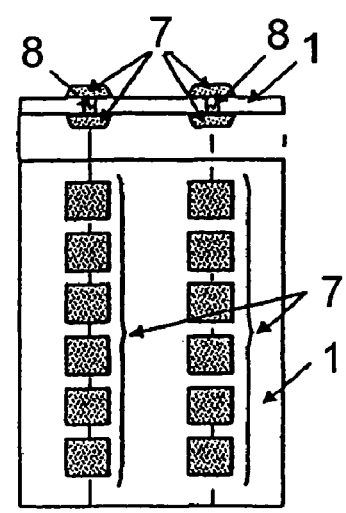
FIG. 4 is a cross-section and a see-through view of cleaning material D of Comparative Example 1.

A number of holes were made through a base sheet Bemliese RB-149 (available from Asahi Kasei Fibers Corp). A commercially available compression type cleaning resin compound Nikalet ECR SW-7320 (available from Nippon Carbide Industries Co., Inc.) was ground to powder and adhered to both sides of the through-holes by pressing to obtain mold cleaning material D of sheet form shown in FIG. 4.

In FIGS. 1 through 4, numeral 1 indicates a base sheet; 2, tablet-shaped cleaning member (1); 3, a thermoplastic resin film; 4, granular cleaning member (2); 5, powdered cleaning member (3); 6, a heat seal; 7, Nikalet SW-7320 (cleaning resin compound); and 8, a through-hole.

EXAMPLE 4

Two base sheets (Bemliese BA-112, available from Asahi Kasei Fibers Corp.) having a width of 250 mm and a length of 300 mm were joined by heat sealing via a thermoplastic resin film at the two long side edges and the position 50 mm inward from each long side edge.

The inside section formed by the heat seals was filled with the tablet-shaped cleaning member (1) prepared in Preparation Example 1 and heat sealed via a thermoplastic resin film at the two short side edges and the position 50 mm inward from each short side edge to obtain a cleaning member of sheet form.

The unvulcanized rubber sheet (width: 150 mm) prepared in Reference Example 2 was cut to a length of 200 mm. The cut rubber sheet was placed on the center of the cleaning member, and another cleaning member prepared in the same manner was superposed thereon. The three members were fixed at their edges by heat sealing via a thermoplastic resin tape to obtain mold cleaning material E of sheet form shown in FIG. 5.

The resulting mold cleaning material E was subjected to a mold cleaning test. The results obtained are shown in Table 2. As can be seen from the results, the mold cleaning material E showed satisfactory cleaning effects.

EXAMPLE 5

Two 250 mm wide and 300 mm long base sheets (Volans 4091P, from Toyobo Co., Ltd.) were superposed and heat sealed at the two long side edges and along lines parallel to the long side edges at 50 mm interval.

The inner three sections formed by the heat seals were filled with the granular cleaning member (2) prepared in Preparation Example 2, and the base sheets were again heat sealed along both short side edges and a,line 50 mm inward from each short side edge to obtain a cleaning member of sheet form.

A 150 mm wide and 200 mm long cut piece of the unvulcanized rubber sheet prepared in Reference Example 2 was sandwiched between two sheet-shaped cleaning members prepared above in the center. The three members were fixed by heat sealing their edges to obtain mold cleaning material F shown in FIG. 6.

The resulting mold cleaning material F was subjected to a mold cleaning test. The results obtained are shown in Table 2. As can be seen from the results, the mold cleaning material F showed satisfactory cleaning effects.

EXAMPLE 6

Two 250 mm wide and 300 mm long base sheets (Volans 4091P, from Toyobo Co., Ltd.) were superposed and heat sealed along two long side edges and lines parallel to the long side edges at 50 mm interval.

The inner three sections formed by the heat seals were filled with the powdered cleaning member (3) prepared in Preparation Example 3. The two base sheets were again heat sealed along two short side edges and a line 50 mm inward from each short side edge to obtain a cleaning member of sheet form.

Figure 7:
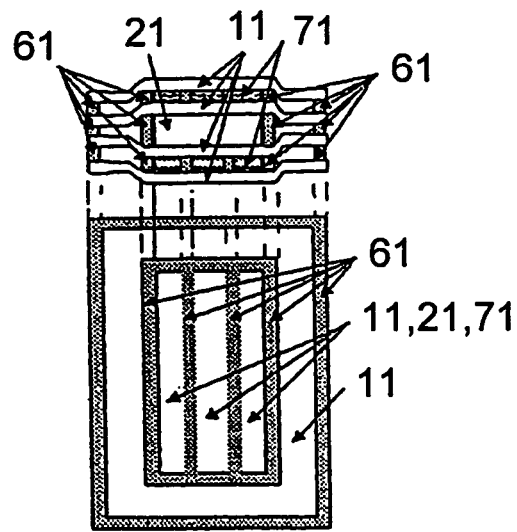
FIG. 7 is a cross-section and a see-through view of cleaning material G of sheet form prepared in Example 6.

A 150 mm wide and 200 mm long cut piece of the unvulcanized rubber sheet prepared in Reference Example 2 was sandwiched between two sheet-shaped cleaning members prepared above, and the three members were fixed by heat sealing their edges to obtain mold cleaning material G of sheet form shown in FIG. 7.

The resulting mold cleaning material G was subjected to a mold cleaning test. The results obtained are shown in Table 2. As can be seen from the results, the mold cleaning material G showed satisfactory cleaning effects.

Figure 5:
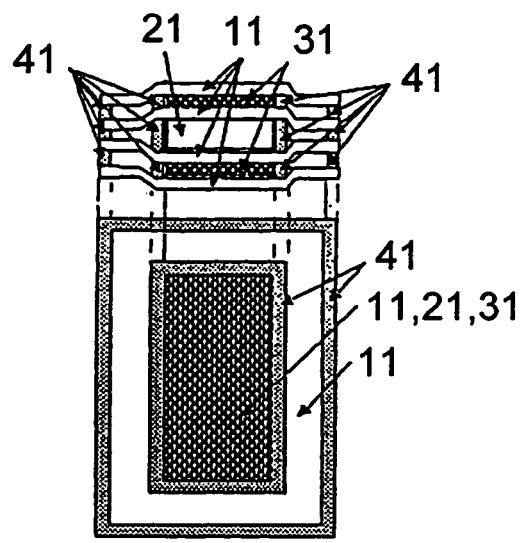
FIG. 5 is a cross-section and a see-through view of cleaning material E of sheet form prepared in Example 4.
Figure 6:
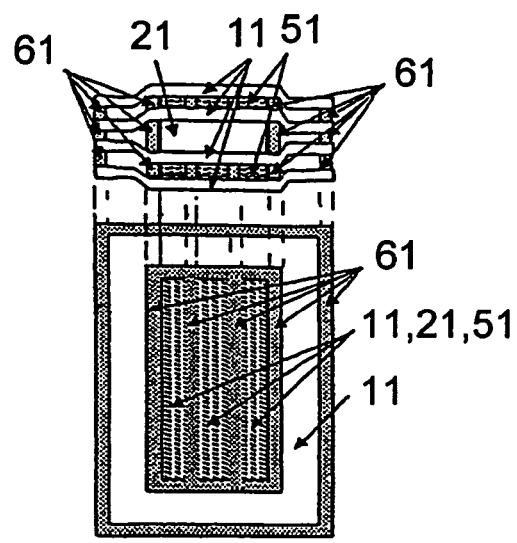
FIG. 6 is a cross-section and a see-through view of cleaning material F of sheet form prepared in Example 5.

In FIGS. 5 to 7, numeral 11 indicates a base sheet; 21, an unvulcanized rubber sheet; 31, tablet-shaped cleaning member (1); 41, a thermoplastic resin film; 51, granular cleaning member (2); 61, a heat seal; and 71, powdered cleaning member (3).

EXAMPLE 7

The plate-shaped cleaning member (4) prepared in Preparation Example 4 was cut to a length of 200 mm. The cut piece was sandwiched between two 200 mm wide and 300 mm long base sheets of Bemliese RB-149 (from Asahi Kasei Fibers Corp.) in the center and fixed by pressing. The cutting and fixing of the plate-shaped cleaning member (4) were carried out immediately after the preparation. The four side edges of the two base sheets were heat sealed via a thermoplastic resin tape to obtain mold cleaning material H of sheet form shown in FIG. 8.

The resulting mold cleaning material H was subjected to a mold cleaning test. The results obtained are shown in Table 3. As can be seen from the results, the mold cleaning material H showed satisfactory cleaning effects.

EXAMPLE 8

The sheet-shaped cleaning member (5) prepared in Preparation Example 5 was sandwiched between two 250 mm wide and 300 mm long base sheets of Bemliese RB-149 in the center. The four side edges of the two base sheets were heat sealed via a thermoplastic resin tape to obtain sheet-shaped mold cleaning material I shown in FIG. 9.

The resulting mold cleaning material I was subjected to a mold cleaning test. The results obtained are shown in Table 3. As can be seen from the results, the mold cleaning material I showed satisfactory cleaning effects.

EXAMPLE 9

The sheet-shaped cleaning member (6) prepared in Preparation Example 6 was sandwiched between two 250 mm wide and 300 mm long base sheet of Bemliese RB-149 in the center. The four side edges of the two base sheets were joined together with a hot-melt adhesive to obtain mold cleaning material J of sheet form shown in FIG. 10.

The resulting mold cleaning material J was subjected to a mold cleaning test. The results obtained are shown in Table 3. As can be seen from the results, the mold cleaning material J showed satisfactory cleaning effects.

Figure 8:
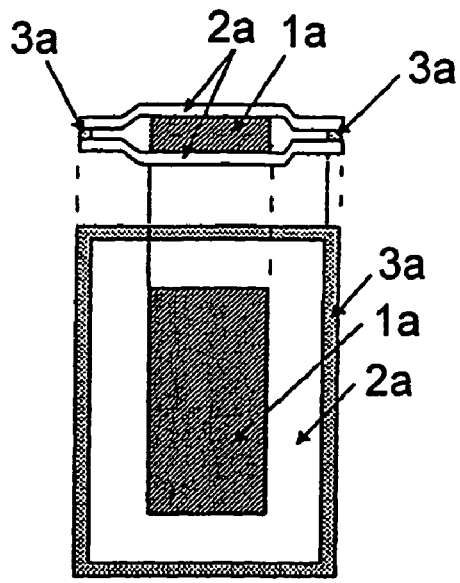
FIG. 8 is a cross-section and a see-through view of cleaning material H of sheet form prepared in Example 7.
Figure 9:
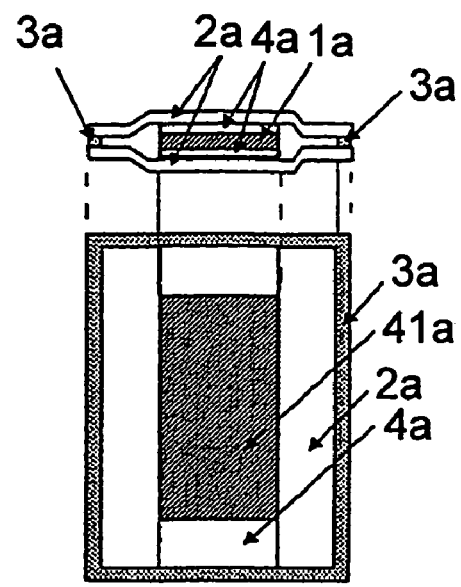
FIG. 9 is a cross-section and a see-through view of cleaning material I of sheet form prepared in Example 8.
Figure 10:
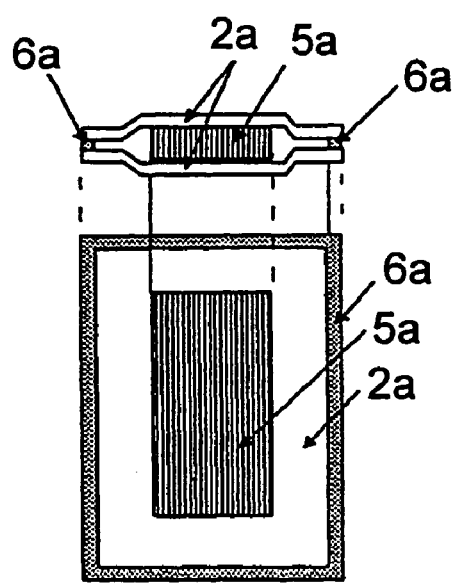
FIG. 10 is a cross-section and a see-through view of cleaning material J of sheet form prepared in Example 9.

In FIGS. 8 to 10, reference character 1a indicates plate-shaped cleaning member (4); 2a, a base sheet; 3a, a thermoplastic resin tape; 4a, a sheet-shaped cleaning member (5); 41a, the cleaning resin part of sheet-shaped cleaning member (5); 5a, sheet-shaped cleaning member (6); and 6a, a hot-melt adhesive.

EXAMPLE 10

The plate-shaped cleaning member (7) prepared in Preparation Example 7 was cut to a length of 200 mm. The cut piece was placed on the central portion of a 200 mm wide and 300 mm long base sheet of Bemliese RB-149 and fixed by pressing with a pressure roll. The cutting and fixing were carried out immediately after the preparation of the cleaning member (7). The unvulcanized rubber sheet prepared in Reference Example 2 was cut to a length of 200 mm and put on the cleaning member (7). The Bemliese sheet having the cleaning member (7) and another Bemliese sheet having another cleaning member (7) prepared in the same manner as described above were superposed on each other with their cleaning member side inward while sandwiching the cut rubber sheet between the two cleaning members (7). The five members were fixed by pressing with a pressure roll, and the four side edges of the two base sheets were heat sealed via a thermoplastic resin tape to obtain mold cleaning material K of sheet form shown in FIG. 11.

The resulting mold cleaning material K was subjected to a mold cleaning test. The results obtained are shown in Table 4. As can be seen from the results, the mold cleaning material K showed satisfactory cleaning effects.

EXAMPLE 11

A 200 mm long cut piece of the unvulcanized rubber sheet prepared in Reference Example 2 was sandwiched between two sheet-shaped cleaning members (8) prepared in Preparation Example 8 in the center and fixed by pressing with a pressure roll. The resulting laminate was sandwiched between two 200 mm wide and 300 mm long base sheets of Bemliese RB-149 in the center. The four side edges of the two base sheets were heat sealed via a thermoplastic resin tape to obtain a sheet-shaped cleaning material L shown in FIG. 12.

The resulting mold cleaning material L was subjected to a mold cleaning test. The results obtained are shown in Table 4. As can be seen from the results, the mold cleaning material L showed satisfactory cleaning effects.

EXAMPLE 12

A 200 mm long cut piece of the unvulcanized rubber sheet prepared in Reference Example 2 was sandwiched between two sheet-shaped cleaning members (9) prepared in Preparation Example 9 in the center and fixed by pressing with a pressure roll. The resulting laminate was sandwiched between two 250 mm wide and 300 mm long base sheets of Bemliese RB-149 in the center. The four side edges of the two base sheets and the two cleaning members (9) were heat sealed to obtain sheet-shaped cleaning material M shown in FIG. 13.

The resulting mold cleaning material M was subjected to a mold cleaning test. The results obtained are shown in Table 4. As can be seen from the results, the mold cleaning material M showed satisfactory cleaning effects.

Figure 11:
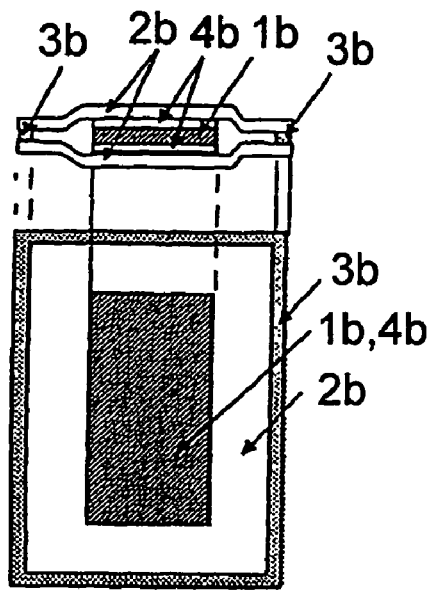
FIG. 11 is a cross-section and a see-through view of cleaning material K of sheet form prepared in Example 10.
Figure 12:
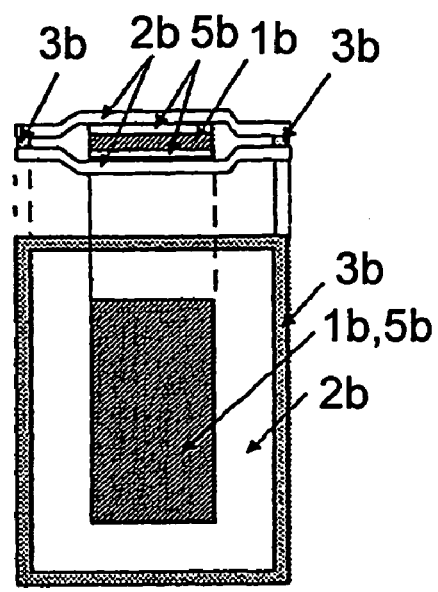
FIG. 12 is a cross-section and a see-through view of cleaning material L of sheet form prepared in Example 11.
Figure 13:
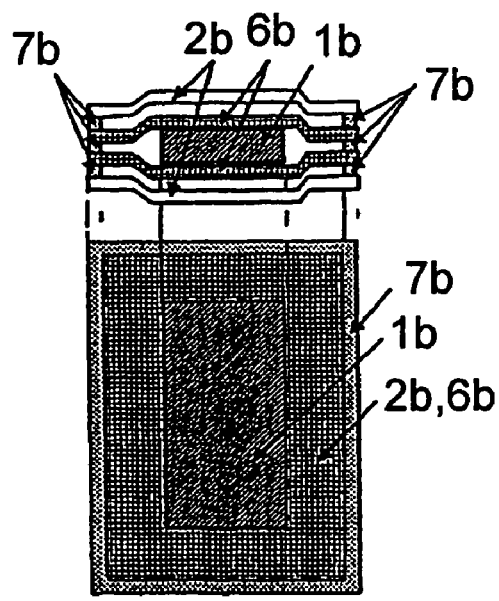
FIG. 13 is a cross-section and a see-through view of cleaning material M of sheet form prepared in Example 12.

In FIGS. 11 through 13, reference character 1b indicates an unvulcanized rubber sheet; 2b, a base sheet; 3b, a thermoplastic resin tape; 4b, a plate-shaped cleaning member (7); 5b, a sheet-shaped cleaning member (8); 6b, a sheet-shaped cleaning member (9); and 7b, a heat seal.

EXAMPLE 13

The plate-shaped cleaning member (10) prepared in Preparation Example 10 was cut to a length of 200 mm. The cut piece was sandwiched between two 200 mm wide and 300 mm long base sheets of HP21 (available from Japan Vilene Co., Ltd.) in the center and fixed by pressing. The four side edges of the two base sheets were heat sealed to obtain mold cleaning material N of sheet form shown in FIG. 14.

The resulting mold cleaning material N was subjected to a mold cleaning test. The results obtained are shown in Table 5. As can be seen from the results, the mold cleaning material N showed satisfactory cleaning effects.

EXAMPLE 14

A 200 mm wide and 300 mm long base sheet of T0510 (available from Dynic Corp.) was cut along a rectangle each side of which was 25 mm inward from each side edge of the sheet to prepare a frame. The frame was placed on a 200 mm wide and 300 mm long base sheet of Bemliese BA112 (from Asahi Kasei Fibers) with all edges even. The granular cleaning member (11) prepared in Preparation Example 11 was disposed inside of the frame, and another Bemliese base sheet of the same size was superposed thereon. The four side edges of the laminate were heat sealed to obtain a sheet-shaped cleaning material O shown in FIG. 15.

The resulting mold cleaning material O was subjected to a mold cleaning test. The results obtained are shown in Table 5. As can be seen from the results, the mold cleaning material O showed satisfactory cleaning effects.

EXAMPLE 15

The pasty cleaning member (13) prepared in Preparation Example 13 was spread on the central area, 150 mm wide and 250 mm long, of a 200 mm wide and 300 mm long base sheet of HP21 (available from Japan Vilene Co., Ltd.) and dried at 70° C. to prepare a supported cleaning member. The resulting supported cleaning member and another supported cleaning member prepared in the same manner were superposed on each other with the cleaning member side inward and with the sheet-shaped molding member (12) prepared in Preparation Example 12, cut to the same size as the cleaning member (13), being interposed between the two cleaning members (13). The three members (two cleaning members (13) and the molding member (12)) were fixed by pressing with a pressure roll, and the four side edges of the two base sheets were heat sealed to obtain mold cleaning material P of sheet form shown in FIG. 16.

The resulting mold cleaning material P was subjected to a mold cleaning test. The results obtained are shown in Table 5. As can be seen from the results, the mold cleaning material P showed satisfactory cleaning effects.

COMPARATIVE EXAMPLE 2

Figure 14:
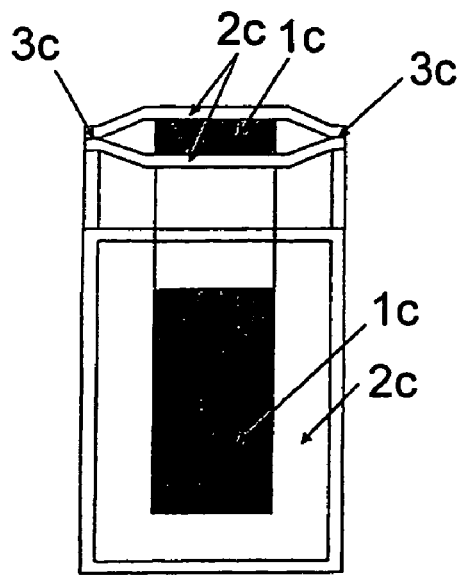
FIG. 14 is a cross-section and a see-through view of cleaning material N of sheet form prepared in Example 13.

Mold cleaning material Q of sheet form shown in FIG. 14 was prepared in the same manner as in Example 13, except for using base sheets of H-8010 (available from Japan Vilene Co., Ltd.) in place of the base sheets of HP21.

The resulting mold cleaning material Q was subjected to a mold cleaning test. The results obtained are shown in Table 5.

Figure 15:
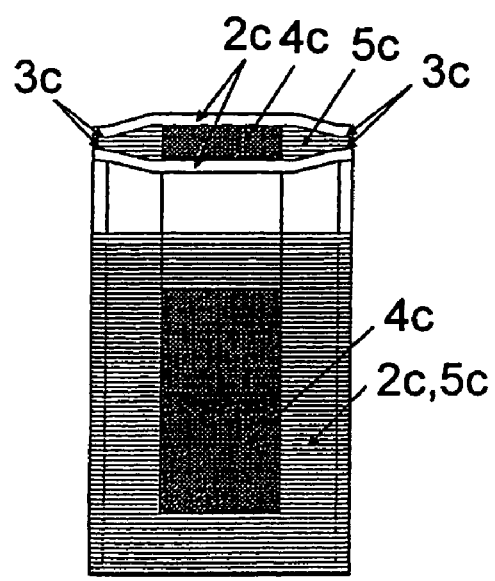
FIG. 15 is a cross-section and a see-through view of cleaning material O of sheet form prepared in Example 14.
Figure 16:
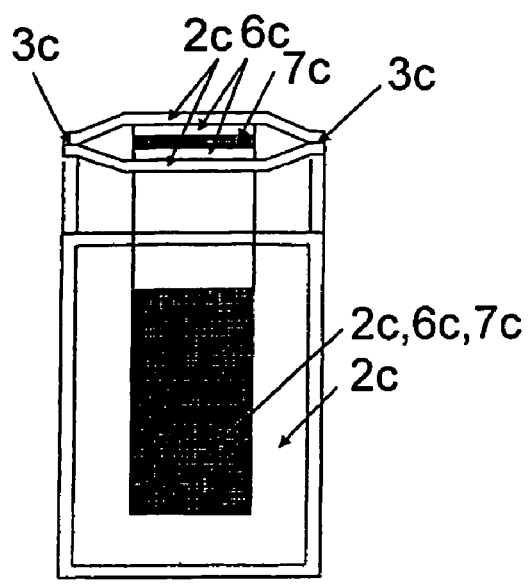
FIG. 16 is a cross-section and a see-through view of cleaning material P of sheet form prepared in Example 15.

In FIGS. 14 through 16, reference character 1c indicates plate-shaped cleaning member (10); 2c, a base sheet; 3c, a heat seal; 4c, granular cleaning member (11); 5c, a base sheet; 6c, cleaning member (13); and 7c, sheet-shaped molding member (12).

The mold cleaning test of mold cleaning materials A to Q, the results of which are shown below, was carried out as follows.

Test Method:

Five hundred shots of a commercially available biphenyl epoxy resin molding compound (CEL-9200XU, available from Hitachi Chemical Co., Ltd.) were made in a 12-cavity mold for TQFP packaging to create mold stain. The mold cleaning material was repeatedly molded in the stained mold until the mold surface was cleared of the stain.

The capabilities of filling the cavities with the resin (cavity filling capabilities) were evaluated by the percentage of upper and lower cavity halves that were completely filled with the resin to the total 24 halves of the 12 cavities.

The anti-chipping properties were evaluated by the number of chippings in the cavities.

TABLE 1

|  | Example | | | Compar. |
| --- | --- | --- | --- | --- |
|  | 1 | 2 | 3 | Example 1 |
| Average Time for Placement (sec) | 2 | 2 | 2 | 10 |
| Mold Temp. (° C.) | 175 | 175 | 175 | 175 |
| Curing Time (sec) | 180 | 180 | 180 | 180 |
| Number of Cleaning Shots Required | 3 | 3 | 3 | 5 |
| Average Time for Post-treatment (sec) | 10 | 10 | 10 | 15 |
| Total Cleaning time (min) | 10 | 10 | 10 | 18 |

TABLE 2

|  | Example | | | Compar. |
| --- | --- | --- | --- | --- |
|  | 4 | 5 | 6 | Example 1 |
| Average time for Placement (sec) | 2 | 2 | 2 | 10 |
| Mold Temp. (° C.) | 175 | 175 | 175 | 175 |
| Curing Time (sec) | 180 | 180 | 180 | 180 |
| Number of Cleaning Shots Required | 3 | 3 | 3 | 5 |
| Average Time for Post-treatment (sec) | 10 | 10 | 10 | 15 |
| Total Cleaning Time (min) | 10 | 10 | 10 | 18 |
| Number of Chippings | 0 | 0 | 0 | 5 |

TABLE 3

|  | Example | | | Compar. |
|---|---|---|---|---|
|  | 7 | 8 | 9 | Example 1 |
| Average Time of Placement (sec) | 2 | 2 | 2 | 10 |
| Mold Temp. (° C.) | 175 | 175 | 175 | 175 |
| Curing Time (sec) | 180 | 180 | 108 | 180 |
| Number of Cleaning Shots Required | 3 | 3 | 3 | 5 |
| Average Time for Post-treatment (sec) | 10 | 10 | 10 | 15 |
| Total Cleaning Time (min) | 10 | 10 | 10 | 18 |

TABLE 4

|  | Example | | | Compar. |
|---|---|---|---|---|
|  | 10 | 11 | 12 | Example 1 |
| Average time for Placement (sec) | 2 | 2 | 2 | 10 |
| Mold Temp. (° C.) | 175 | 175 | 175 | 175 |
| Curing Time (sec) | 180 | 180 | 180 | 180 |
| Number of Cleaning Shots Required | 3 | 3 | 3 | 5 |
| Average Time for Post-treatment (sec) | 10 | 10 | 10 | 15 |
| Total Cleaning Time (min) | 10 | 10 | 10 | 18 |
| Number of Chippings | 0 | 0 | 0 | 5 |

TABLE 5

|  | Example | | | Compar. |
|---|---|---|---|---|
|  | 13 | 14 | 15 | Example 2 |
| Porosity (%) of Base Sheets | 94 | 99/85 | 94 | 63 |
| Mold Temp. (° C.) | 175 | 175 | 175 | 175 |
| Curing Time (sec) | 180 | 180 | 108 | 180 |
| Number of Cleaning Shots Required | 3 | 3 | 3 | 3 |
| Cavity Filling Capabilities (%) | 100 | 100 | 100 | 88 |
| Number of Chippings | 0 | 0 | 0 | 3 |

INDUSTRIAL APPLICABILITY

The sheet-shaped mold cleaning material of the present invention, which comprises base sheets having enclosed therein a cleaning member and a molding member, eliminates dusting, shape loss during transportation, and reduction in flowability. In application, since the sealing member, such as a thermoplastic resin tape, serves as a stopper against resin leakage, placement of the cleaning material in a mold is easy, and chipping hardly occurs. As a result, the cured product can be removed extremely easily, which achieves highly efficient mold cleaning and improves the workability. With the use of a fibrous base sheet having a porosity of 70% or more as the outermost layer of the cleaning material, the cleaning material maintains sufficient strength while allowing the cleaning member and the molding member to fill every detail of the mold to accomplish excellent mold cleaning performance.

The invention claimed is:

1. A method of cleaning a mold, said method comprising the steps of:
sandwiching a mold cleaning material between two halves of a heated mold, applying heat and pressure to the mold cleaning material for a given time to cure the cleaning member, and removing the cleaning material,
wherein said mold cleaning material comprises: at least two base sheets, and a combination of a cleaning member and a molding member enclosed between the at least two base sheets,
at least the outermost of said at least two base sheets are fibrous sheets having a porosity of 70% or more,
the cleaning member has at least one of a tablet form, a granular form, a powder form, a sheet form, and a plate form, and
the molding member is at least one of unvulcanized synthetic rubber and unvulcanized natural rubber.

2. A method of cleaning a mold, said method comprising the steps of:
sandwiching a mold cleaning material between two halves of a heated mold, applying heat and pressure to the mold cleaning material for a given time to cure the cleaning member, and removing the cleaning material,
wherein said mold cleaning material comprises: at least two base sheets, a combination of a cleaning member and a molding member enclosed between the at least two base sheets, and a thermoplastic resin film or tape applied to a prescribed part of at least one of said at least two base sheets,
the cleaning member has at least one of a tablet form, a granular form, a powder form, a sheet form, and a plate form, and
the molding member is at least one of unvulcanized synthetic rubber and unvulcanized natural rubber.

3. A method of cleaning a mold, said method comprising the steps of:
sandwiching a mold cleaning material between two halves of a heated mold, applying heat and pressure to the mold cleaning material for a given time to cure the cleaning member, and removing the cleaning material,
wherein said mold cleaning material comprises: at least two base sheets, a combination of a cleaning member and a molding member enclosed between the at least two base sheets by heat sealing the at least two base sheets via a thermoplastic resin film or tape,
the cleaning member has at least one of a tablet form, a granular form, a powder form, a sheet form, and a plate form, and
the molding member is at least one of unvulcanized synthetic rubber and unvulcanized natural rubber.

4. A method of cleaning a mold, said method comprising the steps of:
sandwiching a mold cleaning between two halves of a heated mold, applying heat and pressure to the mold cleaning material for a given time to cure the cleaning member, and removing the cleaning material,
wherein said mold cleaning material comprises: at least two base sheets, a combination of a cleaning member and a molding member enclosed between the at least two base sheets by adhering the at least two base sheets with at least one of a double-sided tape, an adhesive, and a pressure sensitive adhesive,
the cleaning member has at least one of a tablet form, a granular form, a powder form, a sheet form, and a plate form, and
the molding member is at least one of unvulcanized synthetic rubber and unvulcanized natural rubber.

5. A method of cleaning a mold, said method comprising the steps of:
sandwiching a mold cleaning material between two halves of a heated mold, applying heat and pressure to the mold cleaning material for a given time to cure the cleaning member, and removing the cleaning material,
wherein said mold cleaning material comprises: at least two base sheets, a combination of a cleaning member and a molding member enclosed between the at least two base sheets by adhering the at least two base sheets by pressing or deforming the base sheets, the cleaning member has at least one of a tablet form, a granular form, a powder form, a sheet form, and a plate form, and the molding member is at least one of unvulcanized synthetic rubber and unvulcanized natural rubber.

* * * * *